June 28, 1927.

B. R. WILLIAMSON 1,634,128

APPARATUS FOR MOLDING ARTICLES FROM PULP

Filed Aug. 16, 1926   2 Sheets-Sheet 1

Inventor.
Bert R. Williamson
by Heard Smith & Tennant,
Attys.

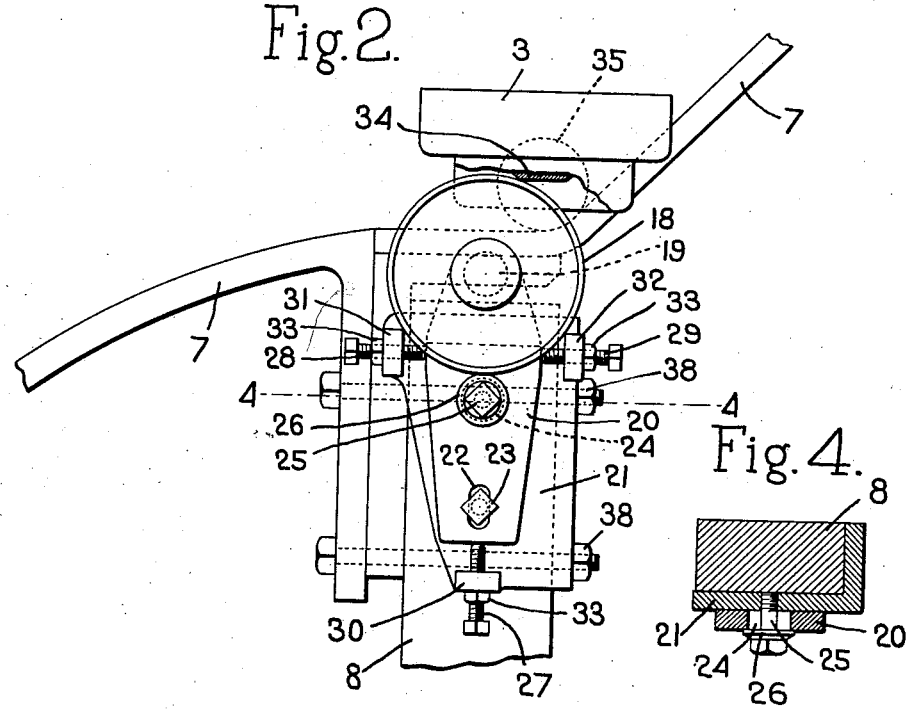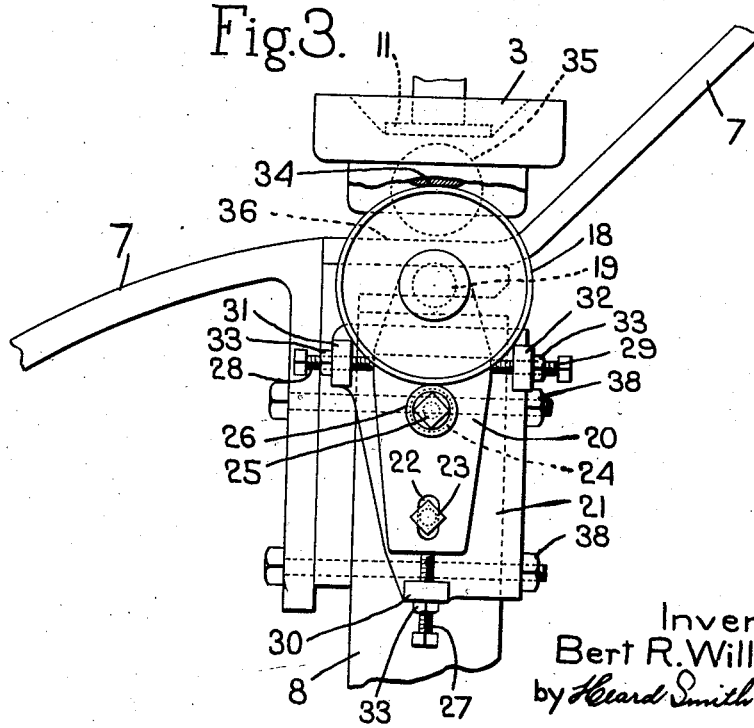

Patented June 28, 1927.

1,634,128

UNITED STATES PATENT OFFICE.

BERT R. WILLIAMSON, OF FAIRFIELD, MAINE, ASSIGNOR TO KEYES FIBRE COMPANY, OF WATERVILLE, MAINE, A CORPORATION OF MAINE.

APPARATUS FOR MOLDING ARTICLES FROM PULP.

Application filed August 16, 1926. Serial No. 129,372.

This invention relates to an apparatus for molding articles from pulp of the type disclosed in U. S. patents to Keys No. 759,616 dated May 10, 1904, Chaplin No. 1,186,647 dated June 13, 1916, and Williamson No. 1,360,848 dated November 30, 1920.

The apparatus disclosed in said patents comprises a mold carrier rotatable about a horizontal axis and carrying a plurality of molds each of which comprises two mold members having nesting faces between which the articles are formed, a vat to contain pulp so located that as the mold carrier rotates one or both mold faces will dip into the pulp, means to apply suction to one face of the mold while it is immersed in the pulp whereby a layer of pulp is deposited on said face, and means to close the mold faces together and compress the pulp layer into an article of the desired shape. The apparatus shown in said patents also includes a transferring mechanism for transferring the molded articles from the molds to a dryer.

In the device shown in said patents one of the mold members is carried by a swinging arm, and the construction is such that after the mold members have been pressed together to form the article, said swinging arm is given an outwardly swinging movement to separate the mold members, the formed article being carried by said swinging mold member into a position to be taken by the transferring mechanism. The transferring mechanism comprises a hub mounted for rotation about a vertical axis and provided with a plurality of radial hollow arms terminating in suckers or pick-offs. The transferring mechanism is so related to the molding mechanism that at a predetermined point in the movements of the swinging mold carrier and the pick-off they are brought into register at which time suction is applied to the pick-off which results in causing the article to be transferred from the mold face to the pick-off, the latter then carrying the article and depositing it on a conveyer which takes it to the dryer.

In the device shown in said patents, the swinging movement of the swinging arm which carries the swinging mold member is controlled by a track, said arm having a roll which engages the track. With this arrangement, the position of the swinging mold member at the time it is brought into register with the pick-off is determined by the engagement of the roll with the track.

In the operation of devices of this type, it is important that the swinging mold member should be accurately registered with the pick-off member at the time of the transfer of the article from the mold member to the pick-off member, because at this time the article is in a wet, soft condition and if there is not accurate registry between the mold member and the pick-off at the time of the transfer, the article is likely to become distorted or damaged.

In the devices shown in the above-mentioned patents, the accuracy of the registry between the swinging mold member and pick-off member is dependent upon the guide way or track which guided the swinging arm in its movement. This guide way or track however is subject to wear and any wear which occurs either in the track or in the roll on the arm which runs on the track will effect the desirable accurate registry of the swinging mold member and pick-off member.

It is one of the objects of my present invention to provide means which are separate from the guide track or roll for definitely and accurately positioning the swinging roll member at the point in its travel where it is brought into registry with the pick-off member, thereby insuring proper registry of these parts regardless of any wear which may occur in the guiding means for the swinging arm.

In the drawings I have shown a selected embodiment of the invention, and inasmuch as the invention relates simply to the means for securing accurate registry of the mold member and pick-off I have not deemed it necessary to illustrate herein a complete machine but have shown only so much of a machine of the type disclosed in said patents as is necessary to a disclosure of a preferred form.

In the drawings:—

Figs. 2 and 3 are fragmentary detailed views illustrating the means for positioning the swinging mold member at the time of its registry with the pick-off member.

Fig. 4 is a section on the line 4—4, Fig. 2.

Figure 1:
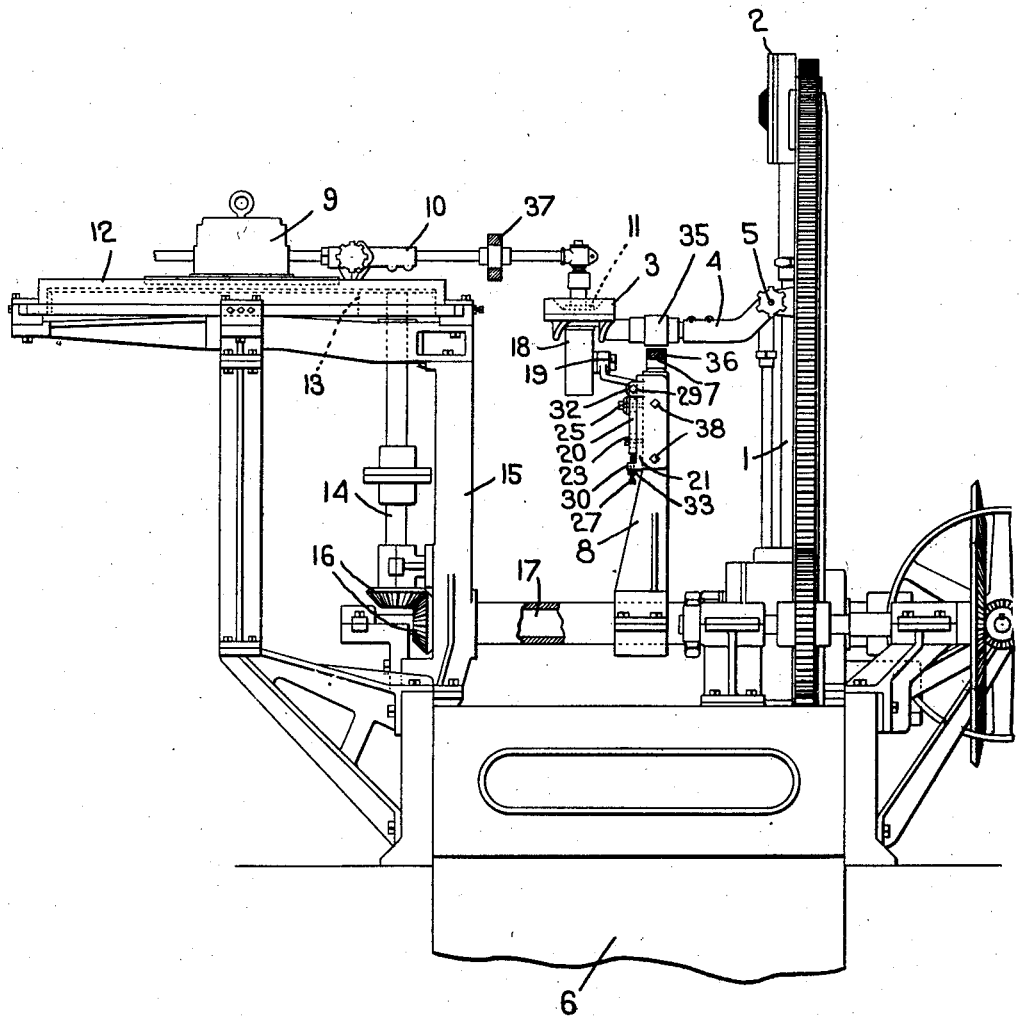
Fig. 1 is an end view of the main portion of the entire apparatus with parts being shown in section—

In the apparatus shown in Fig. 1, 1 indicates a rotary mold carrier which rotates about a horizontal axis and which carries a plurality of molds each comprising two mold members 2 and 3 between which the articles are molded. The mold member 3 is carried by a swinging arm 4 which is pivoted to the mold carrier at 5. Situated beneath the mold carrier is a vat or tank 6 into which one or both of the mold members dip as the mold carrier rotates all as shown in the above-mentioned patents, from which it will be understood that as each mold member 2 passes through the pulp in the vat 6, the pulp is sucked on the face thereof, the two members of the mold being subsequently closed together by a swinging movement of the arm 4 and subjected to pressure thereby to form the molded article. After the article has been formed and during the rotation of the carrier 1, each swinging arm 4 is swung into a horizontal position as shown in Fig. 1 said arm being guided into this position by a track or guide-way 7 which is carried by a suitable stand or support 8. It will be understood by reference to said patents that by the use of suction and compressed air the molded article is separated from the mold member 2 as the arm 4 swings downwardly and is retained on the face of the mold member 3. When the mold member 3 reaches the position shown in Fig. 1 the molded article is removed from said member 3 by the transferring mechanism. The transferring mechanism herein shown is similar to that illustrated in the above-mentioned patents and comprises a rotating hub 9 carrying a plurality of radial arms 10 each arm having at its extremity a suction pick-off member 11. The hub 9 of the transferring mechanism is rotated in timed relation with the mold carrier thereby to bring the pick-off device 11 and the mold member 3 into registry at predetermined points in the travel of each. The mechanism for operating the mold carrier and pick-off device in timed relation is similar to that shown in Patent No. 1,360,848 and forms no part of the present invention, it being understood that the hub 9 is carried by a rotating ring member 12 having internal gear teeth which mesh with and are driven by a pinion 13 carried by a vertical shaft 14 that is journalled in bearings on the frame 15, said shaft being connected by gears 16 to a shaft 17 which is driven from the front of the machine all as described in the above-mentioned patents.

The parts thus far described are or may be all as shown and illustrated in said patents.

As stated above the present invention relates to novel means for accurately positioning the swinging mold member 3 when it has reached the point in its travel illustrated in Fig. 1 at which time it is brought into registry with the pick-off 11.

The means herein provided for thus positioning the mold member is in the form of a positioning device which is separate and independent from the track 7 and which engages the mold member itself and thus brings it into the desired position at the time of its registry with the pick-off member 11. The positioning device herein illustrated is in the form of a roll 18 which is situated to engage the outer face of the swinging member 3 at the point in its travel at which it is in registry with the pick-off member. This is journalled on a stud 19 carried by a bracket 20, the latter being preferably adjustably secured to the stand 8. The stand 8 has a holder 21 bolted thereto by bolts 38 and the bracket member 20 is adjustably secured to this holder so as to provide for adjustment of the roll 18 both vertically and laterally. In the construction shown the bracket 20 is provided at its lower end with a slot 22 in which is received a clamping bolt 23 that screws into the holder 21. Said bracket 20 is also provided with an aperture 24 through which extends another clamping bolt 25 that screws into the holder 21. The aperture 24 is considerably larger than the shank of the bolt 25 and the head 26 of the bolt is larger than the aperture. When the clamping bolts 23 and 25 are loosened, the bracket 20 may be adjusted vertically and also be adjusted laterally because of the size of the aperture 24 relative to the bolt 25. The tightening of the clamping bolts will serve to clamp the member 20 in its adjusted position.

The adjustment of the bracket 24 is facilitated and maintained by three adjusting screws 27, 28 and 29 which are screw threaded through ears 30, 31 and 32 respectively that extend laterally from the holder 21. When the clamping bolts 23 and 25 are loosened, the desired adjustment of the roll 18 may be easily effected by adjusting the clamping screws 27, 28 and 29 and when the desired adjustment has been secured, the clamping screws 23 and 25 may be tightened. Each clamping screw is shown provided with a lock nut 33 to lock it in its adjusted position.

In the device shown in said patents, the mold members 3 are provided on their outer faces with hardened plates with which the squeeze rolls have engagement during the time that the members are pressed together to form the molded article. The positioning roll 18 is so positioned and supported that it acts on this wear plate for positioning the movable members 3. The wear plate is indicated at 34.

In the operation of the device after the article has been formed between the mold members, the swinging arm 4 will swing downwardly into a horizontal position shown in Fig. 1, as the mold member rotates, said arm during this time being guided by the track 7. The arm has a roll 35 mounted thereon which runs on said track 7. This track is provided with a horizontal portion 36 at the point where the mold member 3 is in registry with the pick off 11. The roll 18 is so positioned and adjusted that as the roll 35 moves down the track 7 and comes to the horizontal portion thereof, the mold member will engage the positioning roll 18 as shown in Figs. 2 and 3. Said roll 18 is adjusted so that as the hardened plate 34 of the mold member passes over the roll the arm 4 will be raised sufficiently to lift the roll 35 from the track 7 as shown clearly in Fig. 3 and at this time therefore the mold member 3 is positioned entirely by the roll 18 instead of by the track 7. The roll 18 is adjusted so that as the mold member 3 passes over it and is positioned thereby it is brought into accurate registry with the pick-off 11. The hardened plate 34 will easily withstand any wear to which it is subjected and therefore there is practically no possibility that the proper positioning of the mold member 3 will be effected by wear but even if wear should occur this may be compensated for by proper adjustment of the roll 18.

Having thus described the invention, what is claimed as new, and desired to be secured by Letters Patent, is:

1. A machine for molding articles from pulp comprising a travelling mold having two mold members movable relatively toward and from each other and between which an article may be molded from pulp, a swinging arm on which one of the mold members is carried and by which it is moved toward and from the other mold member, a guide for controlling swinging movements of said arm as the mold travels, a pick-off member to remove a molded article from the swinging mold member, means to bring the pick-off into registry with the swinging mold member at a predetermined point in its travel, and means other than the guide to position the swinging mold member at the time the pick-off is in registry therewith.

2. A machine for molding articles from pulp comprising a travelling mold having two mold members movable relatively toward and from each other and between which an article may be molded from pulp, a swinging arm on which one of the mold members is carried and by which it is moved toward and from the other mold member, a guide for controlling swinging movements of said arm as the mold travels, a pick-off member to remove a molded article from the swinging mold member, means to bring the pick-off into registry with the swinging mold member at a predetermined point in its travel, and means acting directly on the swinging mold member to position it at the time of its registry with the pick-off.

3. A machine for molding articles from pulp comprising a travelling mold having two mold members movable relatively toward and from each other and between which an article may be molded from pulp, a swinging arm on which one of the mold members is carried and by which it is moved toward and from the other mold member, a guide for controlling swinging movements of said arm as the mold travels, a pick-off member to remove a molded article from the swinging mold member, means to bring the pick-off into registry with the swinging mold member at a predetermined point in its travel, and adjustable means separate from the guide to position the swinging mold member at the time of its registry with the pick-off.

4. A machine for molding articles from pulp comprising a travelling mold having two mold members movable relatively toward and from each other and between which an article may be molded from pulp, a swinging arm on which one of the mold members is carried and by which it is moved toward and from the other mold member, a guide for controlling swinging movements of said arm as the mold travels, a pick-off member to remove a molded article from the swinging mold member, means to bring the pick-off into registry with the swinging mold member at a predetermined point in its travel, and a positioning roll situated to engage the swinging mold member and position it at the time of its registry with the pick-off.

5. A machine for molding articles from pulp comprising a travelling mold having two mold members movable relatively toward and from each other and between which an article may be molded from pulp, a swinging arm on which one of the mold members is carried and by which it is moved toward and from the other mold member, a guide for controlling swinging movements of said arm as the mold travels, a pick-off member to remove a molded article from the swinging mold member, means to bring the pick-off into registry with the swinging mold member at a predetermined point in its travel, a positioning roll to engage the swinging mold member and position it at the time of its registry with the pick-off and means for adjusting said roll.

In testimony whereof, I have signed my name to this specification.

BERT R. WILLIAMSON.